US006246157B1

(12) United States Patent
Oliver et al.

(10) Patent No.: US 6,246,157 B1
(45) Date of Patent: Jun. 12, 2001

(54) PUSH-PULL HIGH FORCE PIEZOELECTRIC LINEAR MOTOR

(75) Inventors: John R. Oliver, Newbury Park; Ratnakar R. Neurgaonkar, Thousand Oaks, both of CA (US)

(73) Assignee: Rockwell Science Center LLC, Thousand Oaks, CA (US)

( * ) Notice: Subject to any disclaimer, the term of this patent is extended or adjusted under 35 U.S.C. 154(b) by 0 days.

(21) Appl. No.: 09/379,887

(22) Filed: Aug. 23, 1999

(51) Int. Cl.[7] .................................................... H01L 41/08
(52) U.S. Cl. ........................................ 310/328; 310/323.02
(58) Field of Search .............................. 310/328, 323.02, 310/316, 317

(56) References Cited

U.S. PATENT DOCUMENTS

| 3,138,749 | * | 6/1964 | Stibitz ................................ 310/328 X |
| 3,217,218 | * | 11/1965 | Steele ................................ 310/328 X |
| 3,292,019 | | 12/1966 | Hsu et al. ............................. 310/8.5 |
| 3,377,489 | * | 4/1968 | Brisbane ................................ 310/328 |
| 3,684,904 | * | 8/1972 | Galutva et al. ....................... 310/328 |
| 4,219,755 | * | 8/1980 | O'Neill et al. ..................... 310/328 X |
| 4,714,855 | * | 12/1987 | Fujimoto .............................. 310/328 |
| 4,736,131 | * | 4/1988 | Fujimoto .............................. 310/328 |
| 5,595,677 | | 1/1997 | Neurgaonkar et al. .............. 252/62.9 |
| 5,751,090 | * | 5/1998 | Henderson .......................... 310/328 |
| 5,780,956 | | 7/1998 | Oliver et al. ....................... 310/323 |

FOREIGN PATENT DOCUMENTS

| 1933205 | 1/1971 | (DE) . |
| 0352858 | 7/1989 | (EP) . |
| 1261523 | 10/1968 | (GB) . |

OTHER PUBLICATIONS

Data Sheet for Burleigh Inchworm™ Translator Systems, 2 pages.

* cited by examiner

Primary Examiner—Mark O. Budd
(74) Attorney, Agent, or Firm—Koppel & Jacobs

(57) ABSTRACT

A high force linear displacement piezoelectric motor operates with equal force and reliability in both the push and pull mode. The new motor includes a split motor shaft having with two shaft segments that are coaxially affixed to opposite sides of an expandable and contractable displacement actuator. The displacement actuator has a piezoelectric body coincident with the axis of the shaft segments such that the expansion of the piezoelectric body increases the length of the split motor shaft. The motor has a set of clamps that receive and close on the shaft segments to hold them in place, or open to allow axial displacement of the shaft segments. Linear motion of the split shaft motor is produced by coordinating the opening and closing the clamps with the expansion and contraction of the piezoelectric body.

22 Claims, 6 Drawing Sheets

PUSH-PULL HIGH FORCE PIEZOELECTRIC LINEAR MOTOR

BACKGROUND OF THE INVENTION

1. Field of the Invention

The present invention relates to linear electric motors and more particularly to a high force, step and repeat piezoelectric linear motor.

2. Description of the Related Art

Many types of electrical motors have been developed that provide rotational force such as three-phase motors, induction motors, split-phase motors, etc. However, there is a need for motors that provide linear displacement for use in applications such as aircraft flaps, electrical powered sunroofs or electrically powered car seats. Some of the more heavy duty applications require a linear displacement force in excess of 220 Newtons.

Currently, ball and screw type motors are frequently used for producing linear displacement and comprise a threaded shaft and a metal ball with a threaded hole that mates with the threaded shaft. As the shaft turns, the metal ball rides up or down the shaft to linearly displace the metal ball and any attached mechanism. One problem with this motor is the high tolerance that is required between the ball and the shaft, particularly when used in high accuracy applications. Through use, the threads on the shaft and the ball tend to wear, resulting in a backlash when the motor is stopped or encounters a load, thus reducing positioning accuracy.

The ball and screw motor is powered by an electric motor which can overheat and be damaged or destroyed if the motor stalls under an excessive load. Also, electric motors generally work most efficiently at one speed; when the motor is slowed under load its efficiency drops.

Furthermore, the force produced by the shaft and ball displacement is directly related to the power of the electrical motor. For increased power, the size of the electrical motor must be increased. In applications requiring a great deal of linear displacement force, the size of the motor can become prohibitive. Ball and screw motors also tend to be relatively expensive.

Piezoelectric materials have been used for many different types of motors, primarily in motors that produce a rotation as opposed to displacement. As an example, see U.S. Pat. No. 5,780,956 to Oliver, Neurgaonkar, et.al. Certain piezoelectric materials are useful because of their ability to directly convert electrical energy into motion (mechanical energy). When a voltage is applied to the piezoelectric material, the material will experience a strain that causes it to expand. When the voltage is removed, the strain is removed and the material contracts.

Piezoelectric materials are generally formed from ceramics. One particularly valuable type of piezoelectric device has a plurality of laminated piezoelectric layers that can expand and contract quite rapidly, and combines the expansion of all the layers. The purpose of such layering is to keep the necessary drive voltage to a practical level, while obtaining significant expansion. The expansion can vary, but is generally on the order of 0.002 times the length of the layered piezoelectric material.

Linear piezoelectric motors have been developed using an "inchworm" piezoelectric mechanism to linearly translate a shaft. An example of this type of motor is the Burleigh PZ-577 Inchworm™ Translator System which comprises three piezoelectric cylinders coupled together on a shaft. One of the end cylinders is fixed to a support structure and the other cylinders are allowed to move linearly in relation to the fixed cylinder. The cylinders rely on an inchworm type motion to move the shaft. The first and third cylinders fit around the shaft with near zero clearance, while the middle cylinder has a clearance fit over the shaft. If the first cylinder were fixed, a voltage is applied to the first cylinder and it grips the shaft. A voltage is then applied to the middle cylinder causing it to expand longitudinally down the shaft, pushing the third cylinder ahead of it. A voltage is then applied to the third cylinder, causing it to grip the shaft. The voltage is next removed from the first cylinder causing it to release the shaft, and also from the middle cylinder, causing it to contract and pull the shaft with it. This inchworm cycle results in moving the shaft in the direction of the first cylinder and is repeated to move the shaft linearly.

The primary problem with inchworm type motors is that they typically provide linear push or pull forces in the range of 10 to 15 Newtons and cannot be used for heavy duty applications requiring a greater linear force. Such motors also require precise machining and are not easily adjusted for optimum performance

SUMMARY OF THE INVENTION

The present invention provides a improved linear push-pull motor that relies on the expansion characteristics of piezoelectric materials to produce linear displacement. The new motor employs a step and repeat action, using two clamps fixed on a motor base and a split motor shaft that travels within the clamps such that the clamps hold the shaft when closed.

The split motor shaft preferably comprises two shaft segments and a displacement actuator, with the two shaft segments coaxially aligned and attached to opposite ends of the displacement actuator. Each shaft segment travels within a respective clamp. The displacement actuator has a piezoelectric body that expands when a voltage is applied, with the body oriented such that the expansion is coincident with the axis of the two shaft segments. Expansion of the piezoelectric body results in an increase in the length of the split motor shaft.

Linear movement of the split motor shaft is produced by coordinating the opening and closing of the clamps with the expansion of the piezoelectric body. For example, the split motor shaft can be moved linearly by opening one of the clamps, activating the piezoelectric body to expand the split motor shaft in the direction of the open clamp, closing the open clamp, opening the other clamp, and deactivating the piezoelectric body. When the body is deactivated it contracts, pulling the shaft segment in the open clamp toward the clamped shaft. This cycle results in the split motor shaft moving in the direction of the originally opened clamp. It can be repeated to move the shaft in the same direction or reversed to reverse the shaft direction.

The new motor is less complicated than other linear motors while providing consistent force output over a wide range of speeds with precision and reliability. The new motor is relatively small, but can provide sufficient linear force to pull or push in excess of 220 Newtons. It does not have gears and does not experience gear related power loss, wear and backlash, nor is it overheated or damaged when slowed or stalled. Furthermore, a uniform force output is produced at any motor speed.

These and other further features and advantages of the invention will be apparent to those skilled in the art from the following detailed description, taken together with the accompanying drawings, in which:

DETAILED DESCRIPTION OF THE INVENTION

Figure 1:
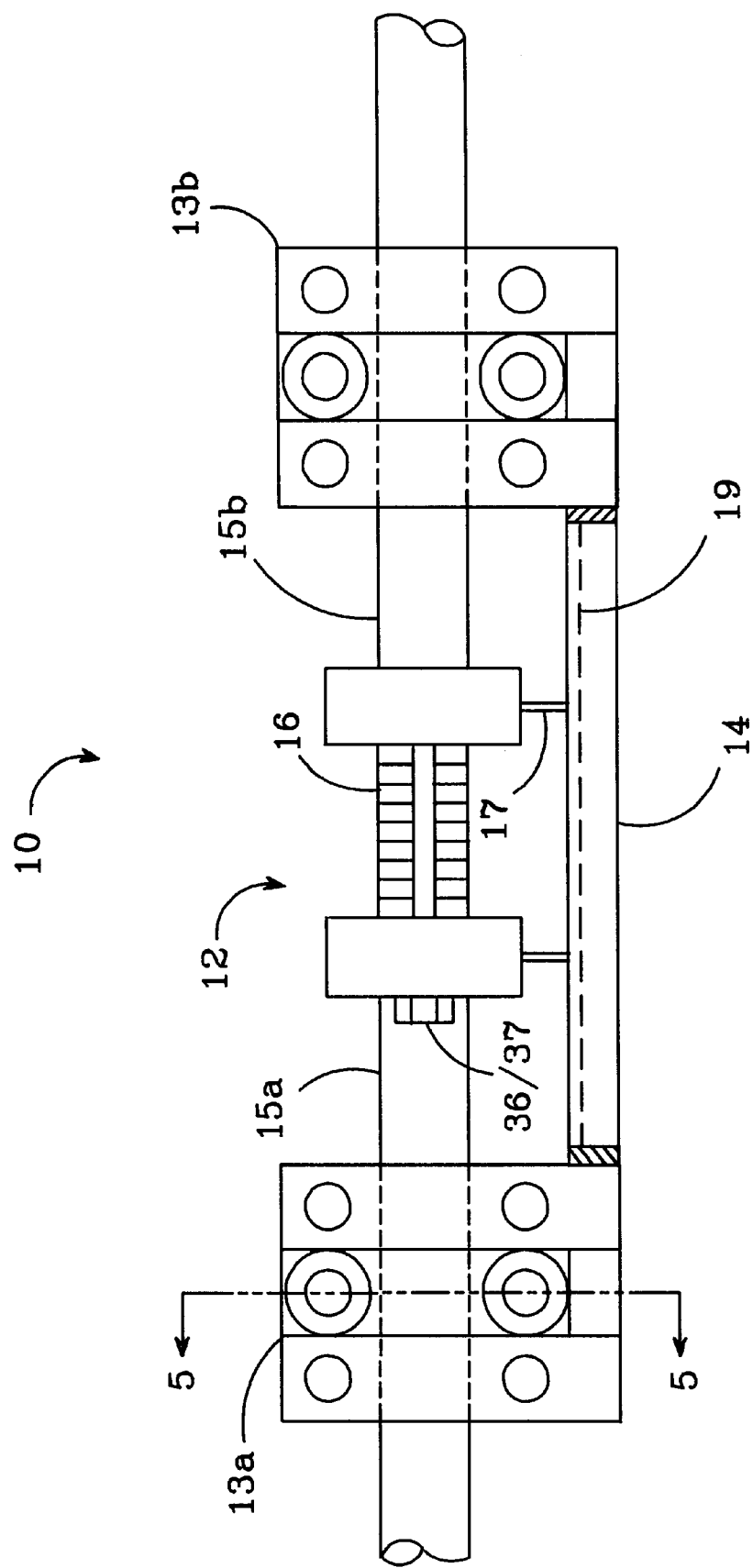
FIG. 1 is an elevation view of the new push-pull piezoelectric motor.

FIG. 1. shows one embodiment of the new high force push-pull piezoelectric motor 10 which consists of a split motor shaft 12 and two clamps 13a and 13b that are fixed on a motor base 14. The split motor shaft has two shaft segments 15a and 15b and an intervening displacement actuator 16, each shaft segment traveling within a respective clamp. The clamps 13a and 13b open and close upon the respective shaft segment 15a and 15b to either allow the shaft segment to slide within the clamp, or to hold the shaft segment in place. The displacement actuator 16 is preferably implemented as a piezoelectric body 17 that expands when a voltage is applied and contracts when the voltage is removed. The expansion of the piezoelectric body 17 pushes the two shaft segments 15a and 15b further apart, lengthening the overall split motor shaft 12. In operation, the two clamps 13a and 13b open and close upon the shaft segments 15a and 15b in cooperation with the expansion and contraction of the piezoelectric body 17 to cause linear motion of the split motor shaft 12.

Figure 2:
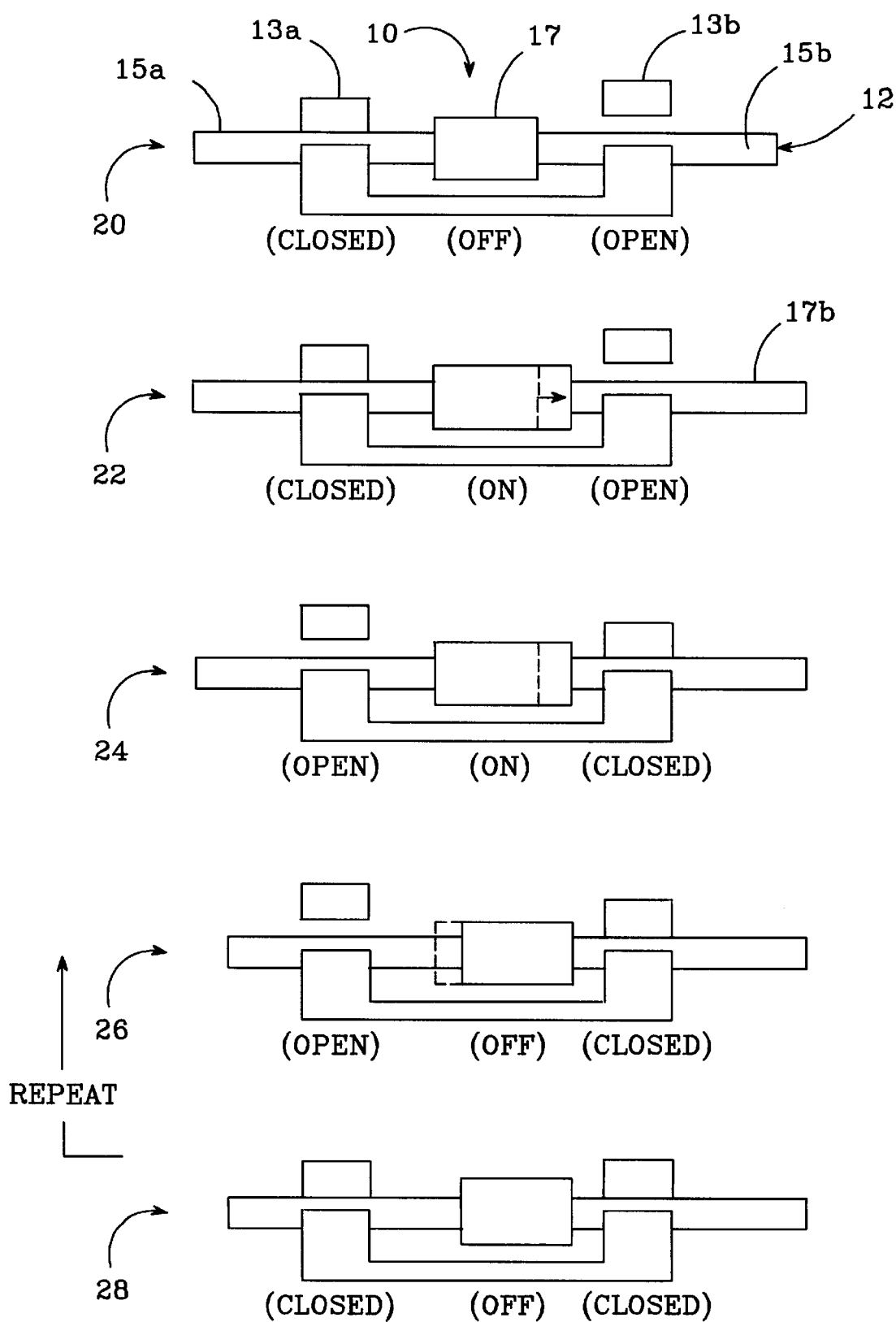
FIG. 2 is a series of simplified elevation views of the new motor showing different states of the motor during operation.

FIG. 2 shows a series of simplified diagrams of the new motor 10 illustrating the different states of the motor during one of its cycles. Linear motion of the split motor shaft 12 is accomplished by a step-and-repeat sequence. When the motor is off, clamps 13a and 13b are closed on the respective shaft segments 15a and 15b, holding the split motor shaft 12 in place. In the first state 20, clamp 13b is opened. In the second state 22, the piezoelectric body 17 is energized and expands moving shaft segment 15b to the right. In the third state 24, with the piezoelectric body 17 still energized, clamp 13b is closed and clamp 13a is opened. In the fourth state 26, the voltage is removed from the piezoelectric body 17, causing the piezoelectric body 17 to contract and pull the shaft segment 15a to the right. In the fifth state 28, clamp 13a is closed, completing the cycle.

Repeating the cycle causes linear motion of the split motor shaft 12 at a speed determined by the cycling frequency and the length of expansion of the piezoelectric body 17. The total travel of the split motor shaft is limited to the travel distance of the piezoelectric body between the two fixed clamps 13a and 13b. The direction of motion is controlled by the timing sequence of the two clamps 13a and 13b. By reversing the timing sequence of FIG. 2, the direction of travel of the split motor shaft 12 can be reversed; this reversal can be accomplished within one cycle. The new motor 10 can either push a load at the end of one of the shaft segments 15a or 15b or pull a load attached to one of the shaft segments.

Figure 3:
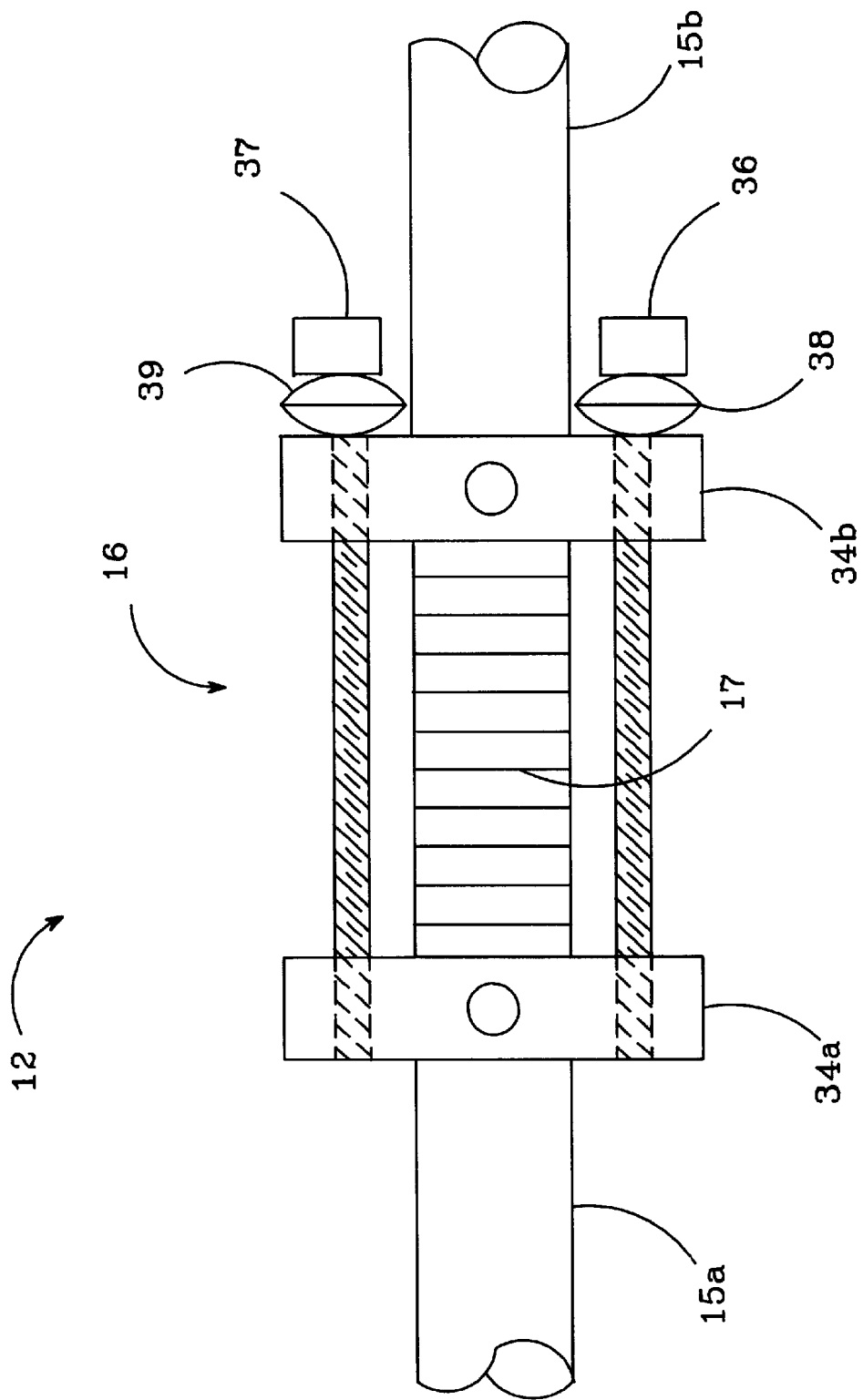
FIG. 3 is a plan view of a displacement actuator for the motor.

FIG. 3 shows an embodiment of displacement actuator 16 in which a piezoelectric body 17 is held between two thrust plates 34a and 34b by a pair of compression screws 36 an 37. The displacement actuator 16 relies on the expansion properties of the piezoelectric body 17 to separate and restore the positions of the shaft segments 15a and 15b relative to each other. Many types of piezoelectric bodies can be used but it is preferably formed from layers of piezoelectric ceramic that are laminated together. The layer thickness typically ranges from 0.1 to 0.4 millimeters, with corresponding operating voltages of 200 to 800 volts. The layers are laminated with metal foil electrodes using epoxy bonding. When a voltage is applied, the overall expansion of the piezoelectric body 17 is the accumulation of the expansion of its individual layers. Many types of piezoelectric ceramics can be used but the preferred embodiment uses layers of high strain Nb-doped PLZT piezoelectric ceramic as disclosed and described in U.S. Pat. No. 5,595,677 to Neurgaonkar, Oliver and Nelson and assigned to the same assignee as the present application.

The piezoelectric body 17 is oriented such that its expansion axis is coincident with the axis of the two shaft segments 15a and 15b. The two thrust plates 34a and 34b are attached to respective shaft segment 15a and 15b by set screws, but could also be threaded or welded to the shaft segments. The piezoelectric body 17 is held between the thrust plates 34a and 34b. The body 17 is not fixed to the thrust plates but instead is held under compression between the thrust plates 34a and 34b by compression springs 38 and 39 and compression screws 36 and 37. Different compression springs can be used but in the preferred motor the compression springs are commercially available Belleville springs.

The compression screws 36 and 37 pass through openings in thrust plate 34b and are threaded into thrust plate 34a with the springs 38 and 39 lodged between the screw heads and thrust plate 34b. The compression screws 36 and 37 are tightened until the piezoelectric body 17 is held between the thrust plates 34a and 34b, while leaving compression play in the compression springs 38 and 39. When the piezoelectric body 17 is energized it expands against the compression springs, lengthening the split motor shaft 12. The split motor shaft 12 functions as a single shaft whose overall length is varied by the action of the piezoelectric body 17.

By holding the piezoelectric body 17 under compression, the new motor 10 provides the unique ability to operate in either push or pull mode with equal force and reliability. In the push or pull mode of operation a load is attached to one of the shaft segments, in this example segment 15b. To push the load to the right, the clamp on shaft segment 15a is closed and piezoelectric body 17 is expanded. The expansion of the body 17 compresses springs 38 and 39 and increases the length of the split motor shaft 12, pushing the shaft segment 15b and its attached load to the right a distance equal to the expansion of the body 17. To pull the load attached to shaft segment 15b to the left, the piezoelectric body 17 is contracted from and expanded state and the clamp on shaft segment 15a is held closed while the clamp on segment 15b is open. This action pulls shaft segment 15b and its attached load to the left toward thrust plate 34a. The above cycles can be repeated to further push or pull the load.

Layered and laminated piezoelectric bodies tend to delaminate if they are placed under excessive tension. If the layered piezoelectric body were simply attached directly to the shaft segments without springs 38 and 39, the tension imposed by the load in the pull mode would be experienced by the layered body, resulting in possible delamination of the layers. By keeping the piezoelectric body 17 under compression (and not attaching it to the thrust plates 34a and 34b) and allowing the compression springs to pull the load, equal reliability is provided in both modes by preventing pull mode delamination.

Furthermore, since the piezoelectric body 17 is held securely in position by the thrust plates 34a and 34b, the compression screws 36 and 37 and the compression springs 38 and 39, it does not require a permanent bond to the thrust plates and shaft segments. The installation, removal and/or replacement of the piezoelectric body 17 is easily accomplished by loosening the compression screws 36 an 37 to remove the piezoelectric body 17, and tightening the screws on the piezoelectric body 17 when it is replaced.

Many different clamps 13a and 13b can be used in the new motor. The push/pull force of the motor is limited by the ability of the clamps 13a and 13b to hold the shaft segments 15a and 15b. The maximum expansion force of the piezoelectric body 17 normally exceeds the holding force of the clamps. For example, a piezoelectric body can commonly produce an expansion force in excess of 1000 Newtons while the clamps 13a and 13b may be able to hold the shafts up to loads on the order of only 250 Newtons. Thus the motor's maximum load capability is limited to the clamps' holding capacity. If the shaft segments slip within the closed clamps, the motor will stall.

Another important feature of the clamps 13a and 13b is the frequency at which the clamp can reliably open and close. If the clamp is made of a material that is susceptible to flexing, it may experience bouncing at high frequencies which reduces the clamp closing force and holding force. To avoid bouncing, the clamp material should be stiff. However, for a high operation frequency, the mass of the clamp material should be low. Accordingly, the clamp material should have low mass and high stiffness, thereby minimizing clamp flexing while allowing for high frequency operation.

Figure 4:
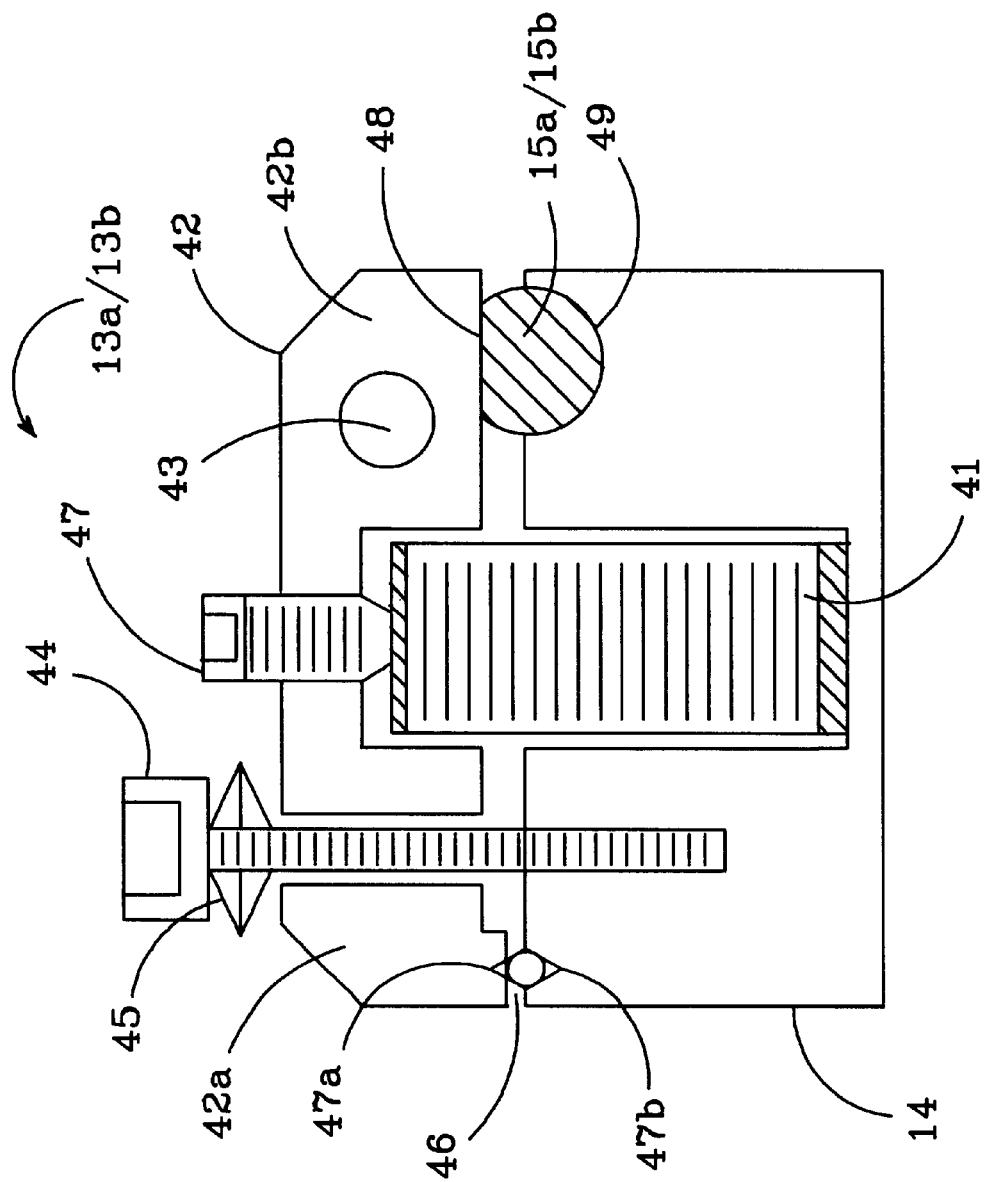
FIG. 4 is a sectional view of one embodiment of a clamp used in the motor.

FIG. 4 shows one embodiment of the clamps 13a and 13b. Each clamp has a layered piezoeletric body 41 similar to the body 17 used in the displacement actuator 16. The piezoelectric 41 is housed within the motor base 14 and extends out a sufficient distance to engage a clamp arm 42. One end of the clamp arm 42 serves as a hinge 42a, while the other end 42b clamps on one of the shaft segments 15a or 15b, the upper portion of which are cut to mate with the lower clamp edge. When a voltage is applied to the piezoelectric body 41 it expands and provides a vertical lifting force to open the clamp arm 42. Clamp arm 42 can be made of various materials, but is preferred made of titanium. Titanium has a low mass and high stiffness, which allows for a high clamping force and low clamp arm flexing at high frequency. In addition, the clamp arm 42 can have a hole 43 or other cutout that further reduces the its mass, provided the hole does not increase clamp arm flexing The clamp arm 42 is mounted on the motor base 14 by a clamp screw 44 which passes through the clamp arm 42 and is treaded into the motor base 14. A compression spring 45 is held between the screw head 44 and the upper surface of clamp arm 42. Different springs can be used such as Belleville springs. The compression spring 45 maintains a downward force on the clamp arm 42 holding it against the upper end of the piezoelectric when the clamp is open and against the shaft segment 15a/15b when the clamp is closed; the play in the spring 45 allowing upward movement of the clamp arm 42. The clamp screw 44 is also used to adjust the clamping force of the clamp arm 42; the tighter the screw the greater the clamping force. However, if the screw 44 is too tight, the compression spring 45 can become fully compressed and/or the upward force of the piezoelectric 41 may not be sufficient to overcome the downward force of the screw 44. In either case, the piezoelectric 41 will be unable to open the clamp arm 42.

The clamp 13a/13b has a hinge which is made of a steel dowel pin 46 lodged within a notch 47a at the hinge end 42a of the clamp and an aligned notch 47b on the motor base. The clamp arm 42 rotates up about the hinge to open when the piezoelectric body 41 is expanded. An adjustment screw 47 is threaded though the clamp arm 42 above the piezoelectric body 41 and engages the body 41. The lower end of the screw 47 serves as the clamp arm's point of contact with the piezoelectric 41. By adjusting the screw 47, the closing point of the clamp arm 42 can be changed. For example, as the adjustment screw 47 is rotated to move it further toward the piezoelectric body 41, the gap between the motor base 14 and the shaft end 42b is increased. By adjusting the screw, the clamping force can be adjusted The motor base 14 has a slot 48 within which one of the shaft segments 15a and 15b rests, the shaft segment sliding within the slot during operation. When used with the clamp shown in FIG. 4, the shaft segments 15a and 15b have a flat surface 49 that serves two purposes. First, the flat surface allows for greater contact area with the clamp arm 42, resulting in reduced deformation of the shaft when the clamp is closed. Second, the flat surface prevents rotation of the shaft segment within the clamp during operation. As shown in FIG. 1, if cylindrical shaft segments are used, anti-rotation pins 18 extending from the thrust plates are provided to mate with a longitudinal slot 19 in the motor base 14 to prevent rotation.

During operation, a voltage is applied to the piezoelectric body 41, causing it to expand and rotate the clamp arm 42 about hinge 46, against the force of the compression spring 45. The hinged clamp 42 provides mechanical amplification of the piezoelectric 41 expansion at the shaft end 42b of the arm. As the clamp arm 42 rotates up, its shaft end 42b opens away from the motor base 14 and the clamping force on the shaft segment 15a or 15b is removed. The shaft segment 15a or 15b is allowed to slide in the motor base slot 48.

Figure 5:
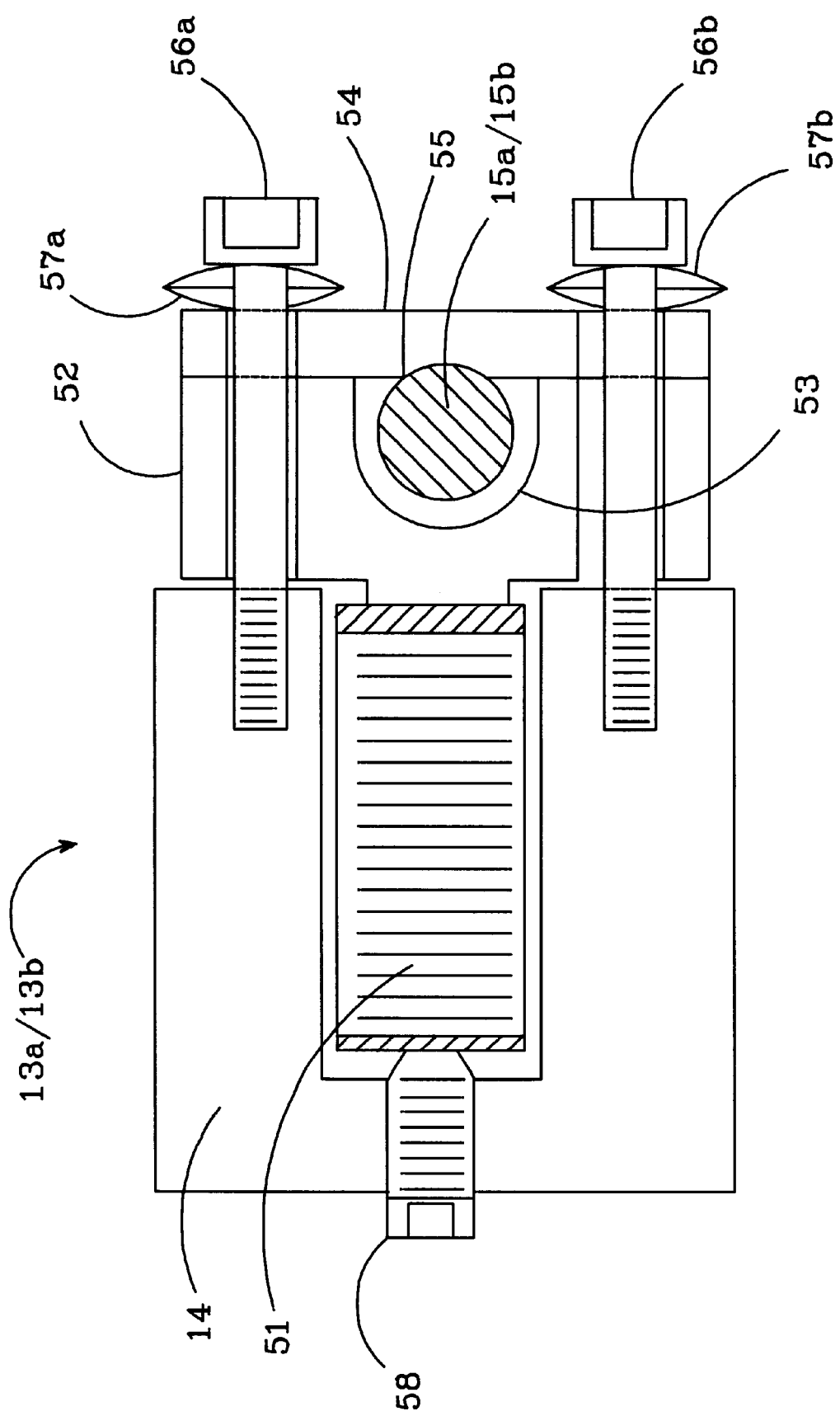
FIG. 5 is a sectional view of an alternate clamp taken along section line 5—5 of FIG. 1.

FIG. 5 shows a second embodiment of the clamp 13a/13b which also uses a layered piezoelectric body 51 similar to the piezoelectric bodies 17 and 41. The piezoelectric 51 is housed within the motor base 14 and is connected to a yoke 12 52 which has a slot 53 for a shaft segment 15a or 15b. A floating clamp 54 provides a downward force on the shaft segment 15a or 15b and has a recess 55 that provides the contact with the shaft segment 15a or 15b. The slot 53 is larger than the diameter of the shaft segment 15a or 15b, and the segment slides in the slot 53 when downward pressure is removed.

Two spring adjustment screws 56a and 56b attach the yoke 52 and floating clamp 54 to the motor base 14. The screws pass through the yoke 52 and floating clamp 54, with the ends of the screws threaded for insertion into corresponding threaded holes in the motor base 14. The remainder of the screw shafts are smooth to allow the yoke 52 and floating clamp 54 to move up and down the screws with expansion and contraction of the actuator 51. Compression springs 57a and 57b are held between the heads of screws 56a and 56b respectively, and the floating clamp 54. The compression springs 57a and 57b maintain a downward force on the floating clamp and yoke, while still allowing them to move upward. The downward force of the compression springs 57a and 57b force the floating clamp down on the shaft segment 15a or 15b, to hold it in place between the floating clamp 54 and bushings (shown in FIG. 6).

A clamp adjustment screw 58 is threaded through the motor base 14 opposite the yoke 52. The adjustment screw 51 engages the piezoelectric body 51 and is used to adjust the starting and finishing points for the expansion of the body 51. As the screw 58 in rotated to move against the piezoelectric 51, its expansion range will be moved toward the shaft segment 15a or 15b. By adjusting the screw 58, the clamping force and range can be adjusted.

In operation, a voltage is applied to the piezoelectric body 51, lifting the yoke 52 and the floating clamp 54 against the compression springs 57a and 57b. The downward pressure of the floating clamp 54 is removed from the shaft segment 15a or 15b, allowing it to slide within the slot 53.

Figure 6:
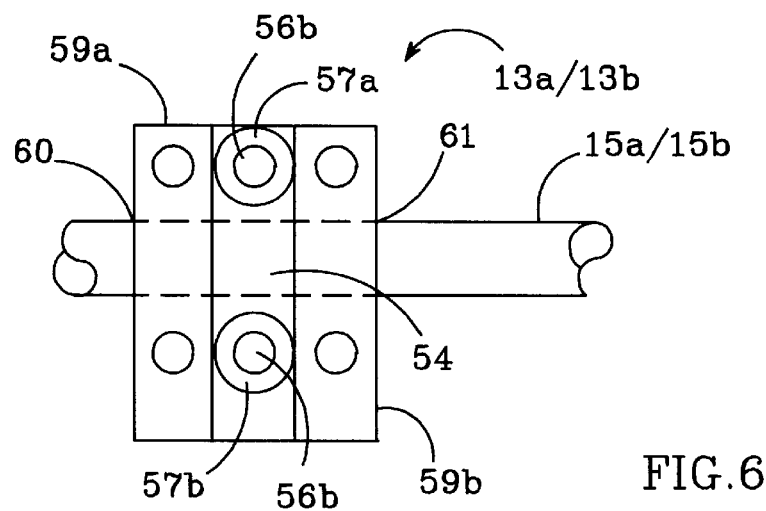
FIG. 6 is a plan view of the clamp in FIG. 5.

As shown in FIG. 6, the clamp of FIG. 5 includes bushing 59a and 59b on the sides of the floating clamp 54. The bushings provide a guide for the shaft segments 15a and 15b when the clamp is open and the shaft segment is sliding. In the preferred embodiment, each bushing 59a and 59b is a metal block fixed to the motor base adjacent the yoke and floating clamp, with the bushings having respective shaft openings 60 and 61. In operation, a shaft segment 15a or 15b passes through the bushings 59a and 59b allowing the yoke and floating clamp 54 to act upon it. When the piezoelectric is contracted, the downward force of the floating clamp 54 holds the shaft segment between the floating clamp 54 and the bushings 59a and 59b. When the clamp is opened, pressure from the floating clamp is removed from the shaft segment 15a or 15b, which is allowed to slide within the bushing holes.

Figure 7:
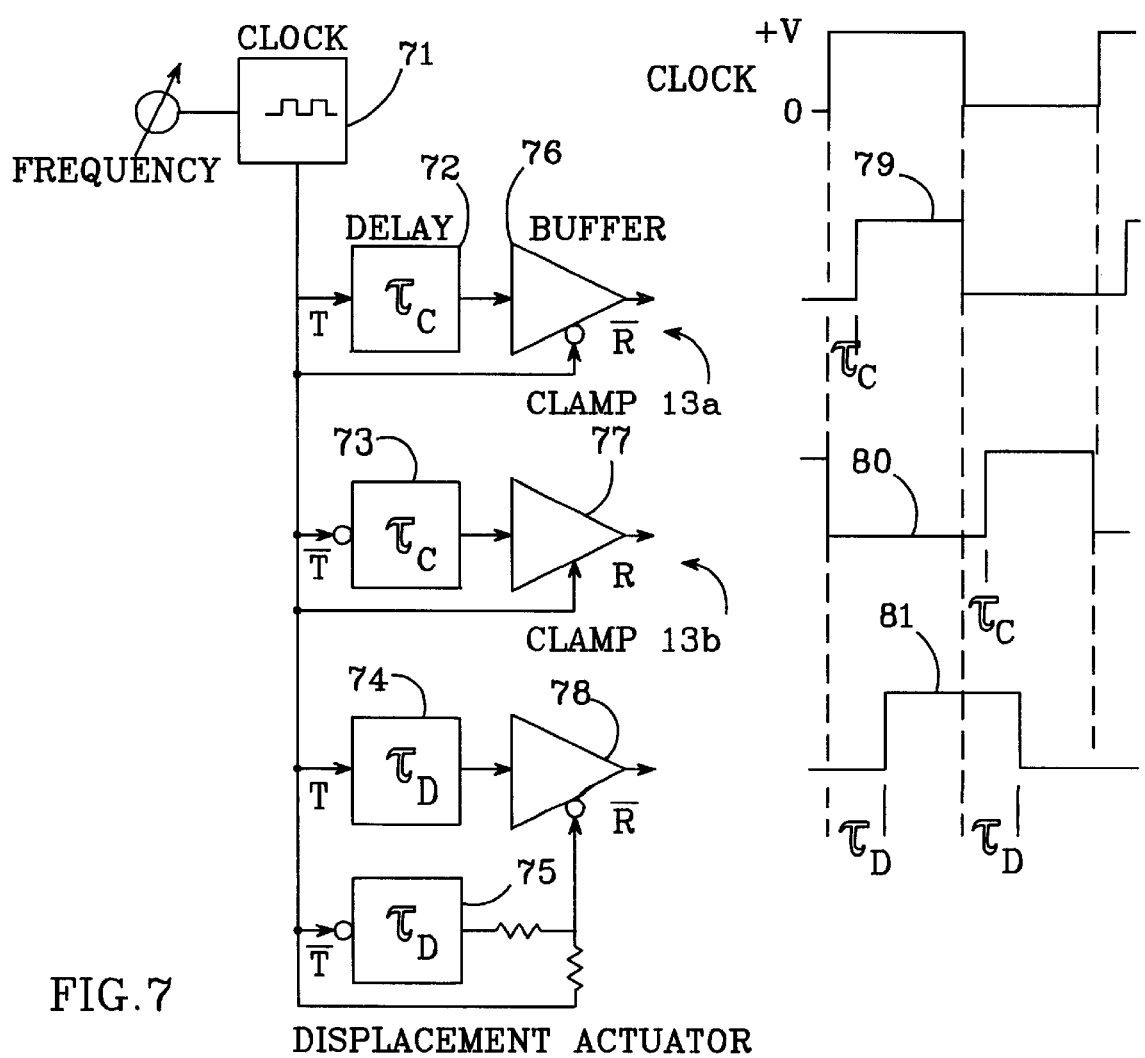
FIG. 7 is a block diagram and a timing diagram for an electrical control circuit for the new motor.
Figure 1:
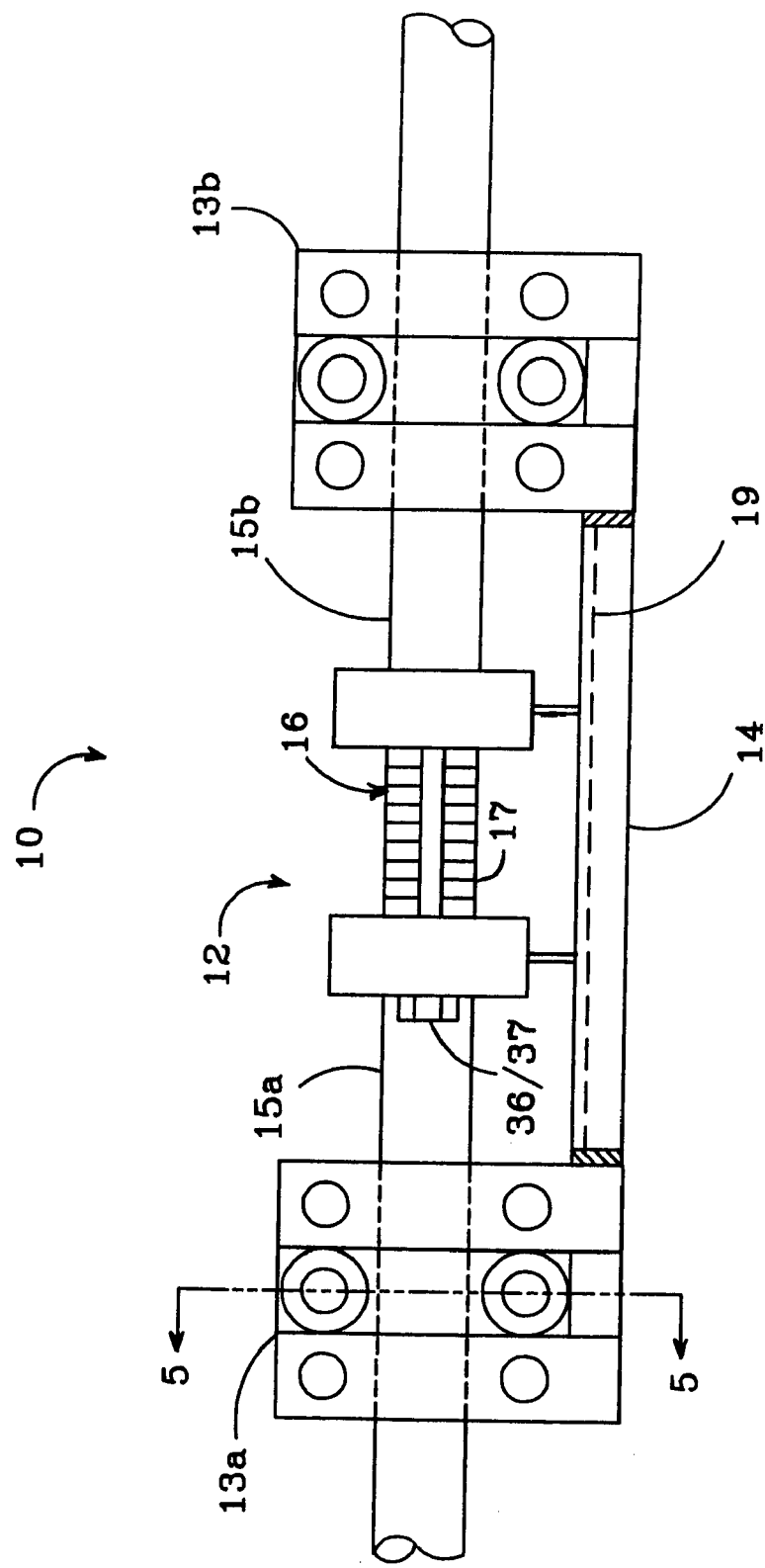
Figure 2:
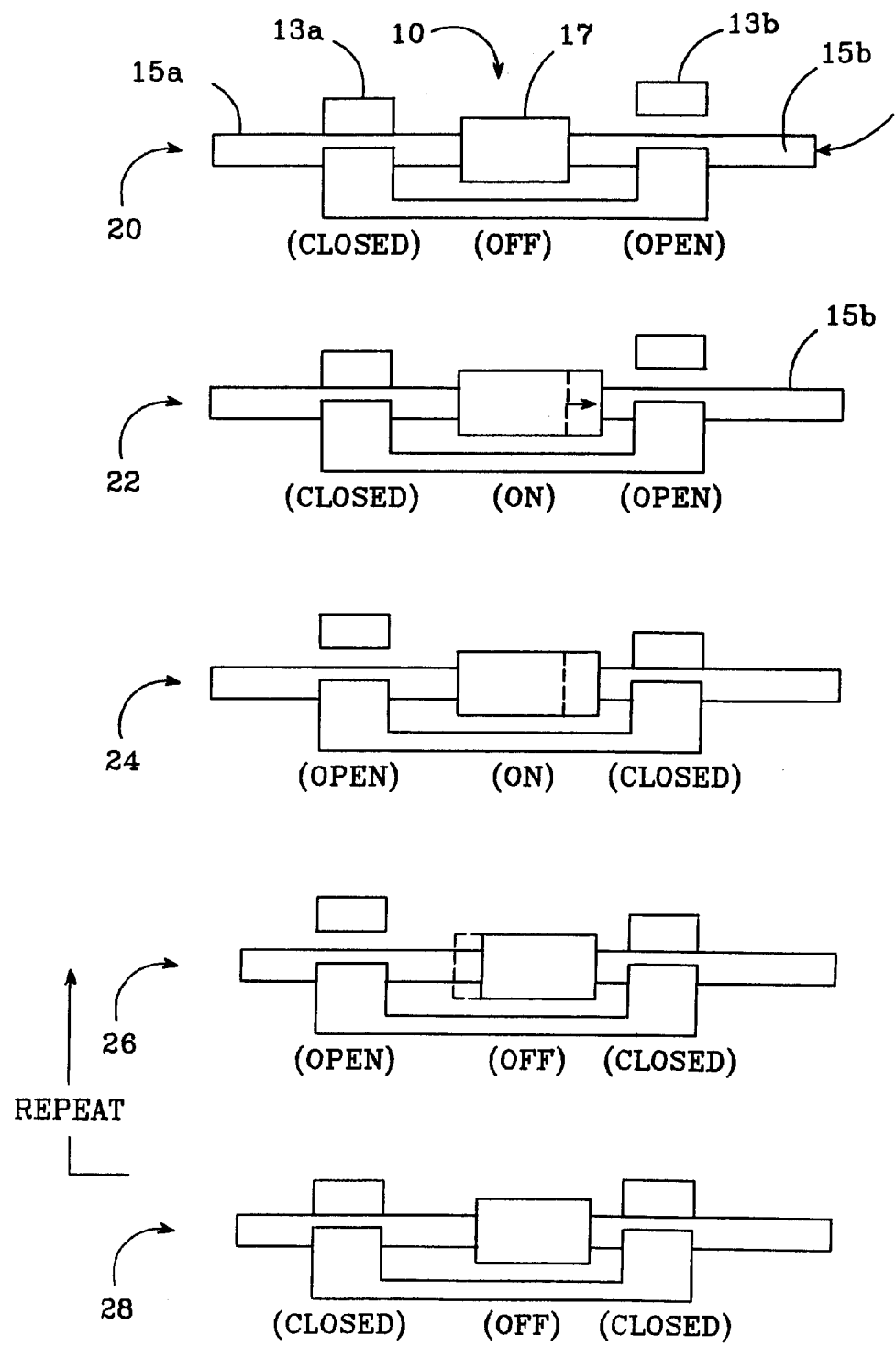
Figure 4:
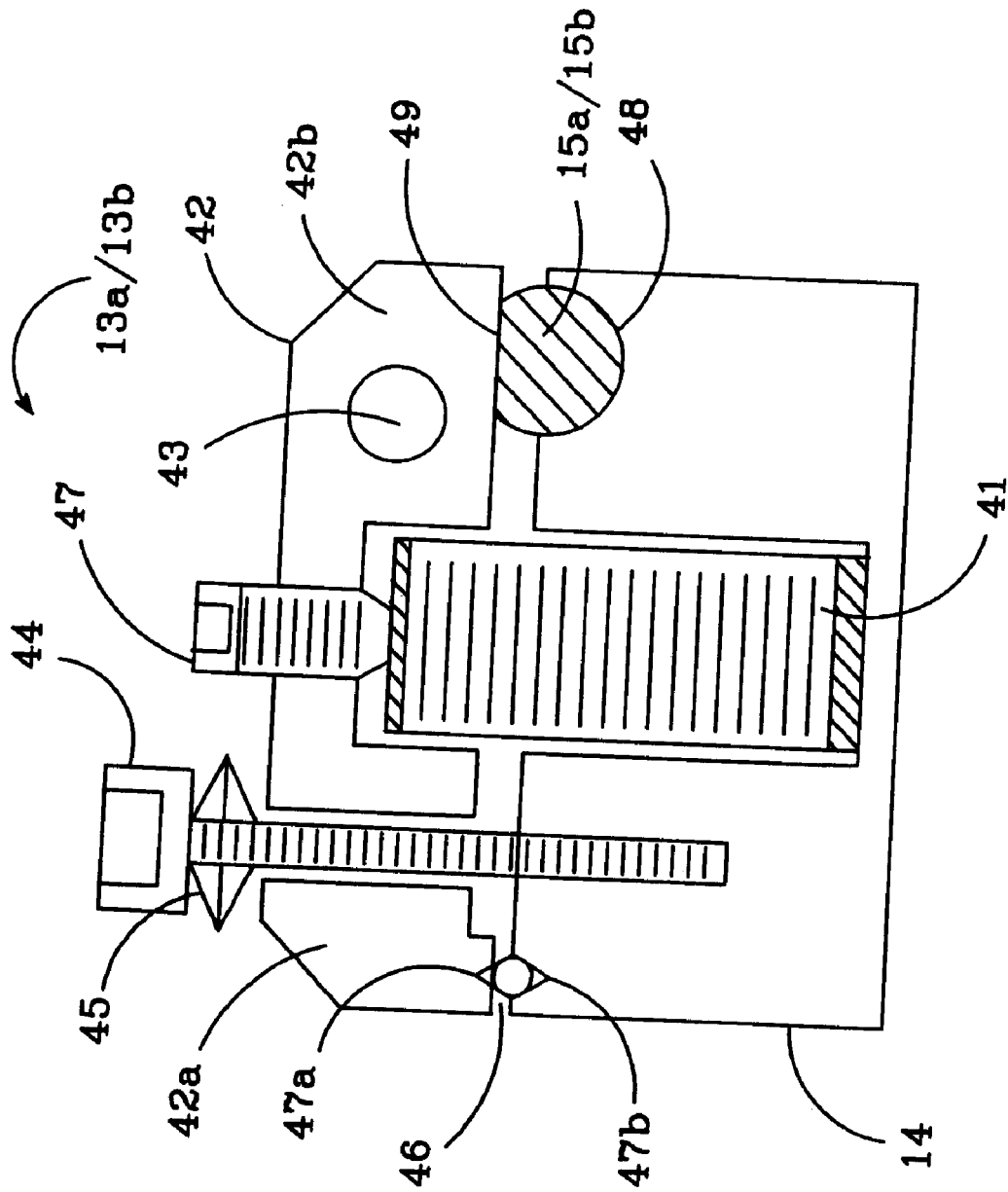

The control voltages to energize the piezoelectric bodies 17,41 and 51 can be produced by many different circuits. FIG. 7. is a block diagram one such circuit and also shows the waveform that is produced to excite each of the piezoelectric bodies. Each of the waveforms is generated from a clock signal that is delayed for a predetermined amount of time by one or more commercially available dual 555 timers such as the LM 556 timer by National Semiconductor. The purpose of these timing delays is to account for the finite time required to energize and de-energize the piezoelectric bodies.

For clamp 13a the output of a clock 71 is connected to the input of a delay circuit 72, the output of which transitions from LO to HI after delay period $\tau_C$ following the positive transition of a clock signal. The transition from HI to LO is not delayed. For clamp 13b, the output of clock 71 is inverted and connected to delay circuit 73, the output of which transitions from LO to HI when a negative clock transition is received after one-half clock cycle, following the same delay period $\tau_C$; the output of buffer circuit 77 goes LO at the next positive transition of the clock pulse. Only one of the waveforms 79 and 80 for clamps 13a and 13b will be HI at one time. The respective waveforms 79 and 80 are output from respective buffers 76 and 77 to power amplifiers which are connected their respective piezoelectric bodies in clamps 13a and 13b.

The control signal for the split shaft piezoelectric 17 is generated with two delay circuits 74 and 75. The first delay circuit 74 provides a delay $\tau_D$ (greater than $\tau_C$) in the LO to HI transition response to the clock signal, while the second delay circuit 75 is connected to buffer 78 for delay circuit 74 to provide a delay of $\tau_D$ in the transition from HI back to LO when the positive clock pulse has passed. This results in a waveform 81 that transitions from LO to HI after clamp 13a opens, and then transitions from HI to LO after clamp 13a closes and actuator 13b opens. The waveform is connected to a power amplifier and then to the split shaft piezoelectric 16.

When the motor is off, both clamps 13a and 13b are preferably closed, thereby holding the split motor shaft 12 and preventing movement. By closing both clamps the blocking or holding force of the motor when off is at least twice that of its single-clamp stall force during operation. Manual manipulation of the motor position can by accomplished by electrically activating and opening both clamps 13a and 13b. The split motor shaft can then be freely moved by hand to the desired position. Alternatively clamps 13a and 13b can be normally open when the motor off, thereby permitting manual movement of the motor without an electrical input.

The expansion force of each of the piezoelectric bodies 17, 41 and 51 is related to its cross section, the larger the cross section the greater the expansion force. However, as the diameter increases the ability of the piezoelectric to dissipate heat decreases. As the frequency of expansion and contraction increases, larger diameter piezoelectrics can overheat. Accordingly, an optimal size should be chosen for the particular motor to provide the desired displacement force and motor speed. In one embodiment the piezoelectric body has a 1 cm (0.4 inch) diameter and is 2 cm (0.8 inch) long, with the frequency of the motor ranging from 0 to 1000 hertz (Hz). At 500 Hz the displacement speed is 2 cm per second.

The length of expansion or strain of each piezoelectric body when a voltage is applied is the aggregate expansion of its constituent layers. Typically, the expansion is about 0.002 times the length of the piezoelectric body at maximum voltage.

Below the stall force, the motor exhibits a linear speed vs. load characteristic (the load line) which is governed by the force capability and the mechanical stiffness of its piezoelectric drive. If the motor begins to experience slippage due to excess loading, its speed drops until the longitudinal displacement stops. Practical operating load capacities in excess of 220 Newtons have been achieved, with a potential load capacity in excess of 440 Newtons. The upper limit is determined by the attainable clamping forces and flexing in the clamps and the motor base.

Although the present invention has been described in considerable detail with reference to certain specific implementations, other versions are possible. For instance, the motor can have more than two clamps. The split motor shaft can have more than two shaft segments with more than one displacement actuator, and the displacement actuator can have more than one piezoelectric body. The displacement actuator can also have additional compression screws and springs, which can be mounted in different ways. Therefore, the spirit and scope of the appended claims should not be limited to their specific versions.

We claim:
1. A linear displacement motor, comprising:
   a pair of shaft segments;
   a displacement actuator capable of expansion and contraction, said displacement actuator affixed between said shaft segments to axially move said shaft segments relative to each other when said displacement actuator expands or contracts; and
   a pair of clamps arranged to receive respective ones of said shaft segments, each said clamp arranged to alter- nately close to hold its respective shaft segment and open to allow its respective shaft segment to axially displace;

wherein said displacement actuator comprises a piezoelectric body that expands when a voltage is applied and contracts when the voltage is removed, said displacement actuator further comprising a retainer for said piezoelectric body that contacts said body and retains said body in compression between said shaft segments without being bonded to said body, said retainer further comprising two thrust plates and two or more compression screws having respective screw heads, each thrust plate attached to a respective one of said shaft segments, said piezoelectric body mounted between said thrust plates opposite said shaft segments and each said compression screw engaging said thrust plates to hold said piezoelectric body under compression.

2. The motor of claim 1, wherein said retainer further comprises compression springs mounted on respective ones of said compression screws between their screw head and one of said thrust plates.

3. The motor of claim 1, wherein said displacement actuator comprises a laminate of multiple piezoelectric layers.

4. The motor of claim 1, wherein each of said clamps includes a piezoelectric body that expands when a voltage is applied to open the clamp and contracts when the voltage is removed to close the clamp.

5. A linear displacement motor, comprising:

a pair of shaft segments;

a displacement actuator capable of expansion and contraction, said displacement actuator affixed between said shaft segments to axially move said shaft segments relative to each other when said displacement actuator expands or contracts; and a pair of clamps arranged to receive respective ones of said shaft segments, each said clamp arranged to alternately close to hold its respective shaft segment and open to allow its respective shaft segment to axially displace;

wherein each of said clamps includes a piezoelectric body that expands when a voltage is applied to open the clamp and contracts when the voltage is removed to close the clamp, and each said clamp further comprises a clamp arm mounted on a motor base, said clamp arm having a hinge end about which the clamp rotates relative to said motor base and a shaft end to hold a respective one of said shaft segments between said clamp and said motor base when said clamp is closed, said clamp arm rotated up about said hinge end and said shaft end lifted off its respective shaft segment in response to expansion of said clamp piezoelectric body.

6. A linear displacement motor, comprising:

a pair of shaft segments;

a displacement actuator capable of expansion and contraction, said displacement actuator affixed between said shaft segments to axially move said shaft segments relative to each other when said displacement actuator expands or contracts; and a pair of clamps arranged to receive respective ones of said shaft segments, each said clamp arranged to alternately close to hold its respective shaft segment and open to allow its respective shaft segment to axially displace, each clamp formed on a motor base and comprising:

a clamp piezoelectric body that expands when a voltage is applied and contracts when the voltage is removed, said body housed within said motor base;

a clamp arm mounted on said motor base and having a shaft end and a hinge end, said shaft end holding a respective one of said shaft segments between said clamp arm and said m otor base when said clamp is closed, said clamp piezoelectric body engaging said clamp arm;

a clamp screw having a screw head at one end and threaded at its other end, said clamp screw passing through said clamp arm and threading into said motor base near said hinge end of said clamp;

a clamp compression spring mounted between said screw and said clamp; and a hinge between said hinge end of said clamp and said motor base.

7. The motor of claim 6, wherein said clamp further comprises a clamp adjustment screw threaded into said motor base to adjust the portion of said clamp piezoelectric body relative to said base.

8. The motor of claim 6, wherein said hinge comprises a notch in said hinge end of said clamp, an opposing notch on said motor base, and a dowel pin between said notches.

9. The motor of claim 6, wherein said clamp is titanium.

10. A linear displacement motor, comprising:

a pair of shaft segments;

a displacement actuator capable of expansion and contraction, said displacement actuator affixed between said shaft segments to axially move said shaft segments relative to each other when said displacement actuator expands or contracts; and a pair of clamps arranged to receive respective ones of said shaft segments, each said clamp arranged to alternately close to hold its respective shaft segment and open to allow its respective shaft segment to axially displace, and each clamp comprises a clamp piezoelectric body that expands when a voltage is applied and contracts when the voltage is removed, a yoke having a slot for a respective one of said shaft segments, said yoke resting on said piezoelectric body, a floating clamp resting on said yoke and providing a downward force on said shaft segment which is removed when said piezoelectric actuator expands, and a plurality bushings adjacent to said yoke and floating clamp and guiding said shaft segment.

11. A linear displacement motor, comprising:

a pair of shaft segments;

a displacement actuator capable of expansion and contraction, said displacement actuator affixed between said shaft segments to axially move said shaft segments relative to each other when said displacement actuator expands or contracts; and a pair of clamps arranged to receive respective ones of said shaft segments, each said clamp arranged to alternately close to hold its respective shaft segment and open to allow its respective shaft segment to axially displace, each clamp formed on a motor base and comprising:

a piezoelectric body that expands when a voltage is applied and contracts when the voltage is removed, housed within said motor base;

a yoke having a slot for one of said shaft segments, the diameter of said slot being larger than the diameter of said shaft segment, said yoke resting on said piezoelectric body;

a floating clamp resting on said yoke and said shaft segment;

a plurality of spring adjustment screws having respective screw heads and threaded ends, said adjustment screws passing through said floating clamp and said yoke and threading into said motor base; and a plurality of compression springs mounted between said screw heads and said floating clamp.

12. The motor of claim 11, wherein each clamp further comprises at least one bushing guiding a respective one of said shaft segments when said clamp is open.

13. The motor of claim 11, wherein said bushings comprise bushing bodies adjacent to said yoke and floating clamp, each bushing body including a hole which guides a shaft segments.

14. The motor or claim 11, further comprising a threaded clamp adjustment screw in a threaded hole in said motor base opposite said yoke and bearing against said piezoelectric body, said adjustment screw being rotatable to adjust the position of said piezoelectric body.

15. The motor of claim 1, further comprising an electrical circuit that controls the expansion and contraction of said displacement actuator and the opening and closing of said clamps to progressively move said shaft segments in inchworm fashion.

16. A linear displacement motor, comprising:

a split motor shaft that can be lengthened and returned;

a pair of fixed clamps receiving said split motor shaft; and a controller that controls the lengthening and contraction of said split motor shaft and the operation of said clamps to axially displace said shaft, wherein said split motor shaft comprises two shaft segments and a displacement actuator capable of expansion and contraction, said displacement actuator affixed between shaft segments to axially move said shaft segments relative to each other when said displacement actuator expands or contracts, said clamps positioned on opposite sides of said displacement actuator, said displacement actuator comprises a piezoelectric body that expands when a voltage is applied and contracts when the voltage is removed and further comprises a retainer for said piezoelectric body that contacts said body and retains said body in compression between said shaft segments without being bonded to said body, and said retainer further comprises two thrust plates and two or more compression screws having respective screw heads, each thrust plate attached to a respective one of said shaft segments, said piezoelectric body mounted between said thrust plates opposite said shaft segments and each said compression screw engaging said thrust plates to hold said piezoelectric body under compression.

17. The motor of claim 16, wherein each of said clamps includes a piezoelectric body that expands when a voltage is applied to open the clamp.

18. A linear displacement motor, comprising:

a split motor shaft that can be lengthened and returned;

a pair of fixed clamps receiving said split motor shaft; and a controller that controls the lengthening and contraction of said split motor shaft and the operation of said clamps to axially displace said shaft, each of said clamps includes a piezoelectric body that expands when a voltage is applied to open the clamp, and each said clamp further comprises a clamp arm mounted on a motor base, said clamp arm having a hinge end about which the clamp rotates relative to said motor base and a shaft end to hold a respective one of said shaft segments between said clamp and said motor base when said clamp is closed, said clamp arm rotated up about said hinge end and said shaft end lifted off its respective shaft segment in response to expansion of said clamp piezoelectric body.

19. The motor of claim 18, wherein each said clamp further comprises a clamp screw having a screw head at one end and threaded at its other end and a clamp compression spring, said clamp screw passing through said clamp and threading into said motor base near said hinge end of said clamp and said clamp compression spring mounted between said screw head and said clamp.

20. A linear displacement motor, comprising:

a split motor shaft that can be lengthened and returned;

a pair of fixed clamps receiving said split motor shaft; and a controller that controls the lengthening and contraction of said split motor shaft and the operation of said clamps to axially displace said shaft, each of said clamps includes a piezoelectric body that expands when a voltage is applied to open the clamp, and each said clamp comprises a yoke having a slot for a respective one of said shaft segments, said yoke resting on said piezoelectric body, a floating clamp resting on said yoke and providing a downward force on said shaft segment which is removed when said piezoelectric actuator expands, and a plurality of bushings adjacent to said yoke and floating clamp and guiding said respective shaft segment.

21. The motor of claim 20, wherein each said clamp further comprises a plurality of spring adjustment screws having respective screw heads and threaded ends and a plurality of compression springs, said adjustment screws passing through said floating clamp and said yoke and threading into said motor base and said compression springs mounted between said screw heads and said floating clamp.

22. The motor of claim 16, wherein said controller comprises an electrical circuit.

* * * * *

UNITED STATES PATENT AND TRADEMARK OFFICE
CERTIFICATE OF CORRECTION

| | | |
|---|---|---|
| PATENT NO. | : 6,246,157 B1 | Page 1 of 4 |
| APPLICATION NO. | : 09/379887 | |
| DATED | : June 12, 2001 | |
| INVENTOR(S) | : John R. Oliver and Ratnakar R. Neurgaonkar | |

It is certified that error appears in the above-identified patent and that said Letters Patent is hereby corrected as shown below:

In the Drawings:

Replace FIG. 1 with the new enclosed FIG. 1, in which the line for 17 now corresponds to the correct part.
In FIG. 2, change "17b" to -- 15b --.
In FIG. 4, change "48" to -- 49 --.
In FIG. 4, change "49" to -- 48 --.

In column 6, line 49, delete "12 52" and insert -- 52 --.

Signed and Sealed this

Third Day of October, 2006

JON W. DUDAS
*Director of the United States Patent and Trademark Office*